April 12, 1955  H. C. SMITH  2,705,909
APPARATUS FOR STORING CORN
Filed Oct. 14, 1950  5 Sheets-Sheet 1
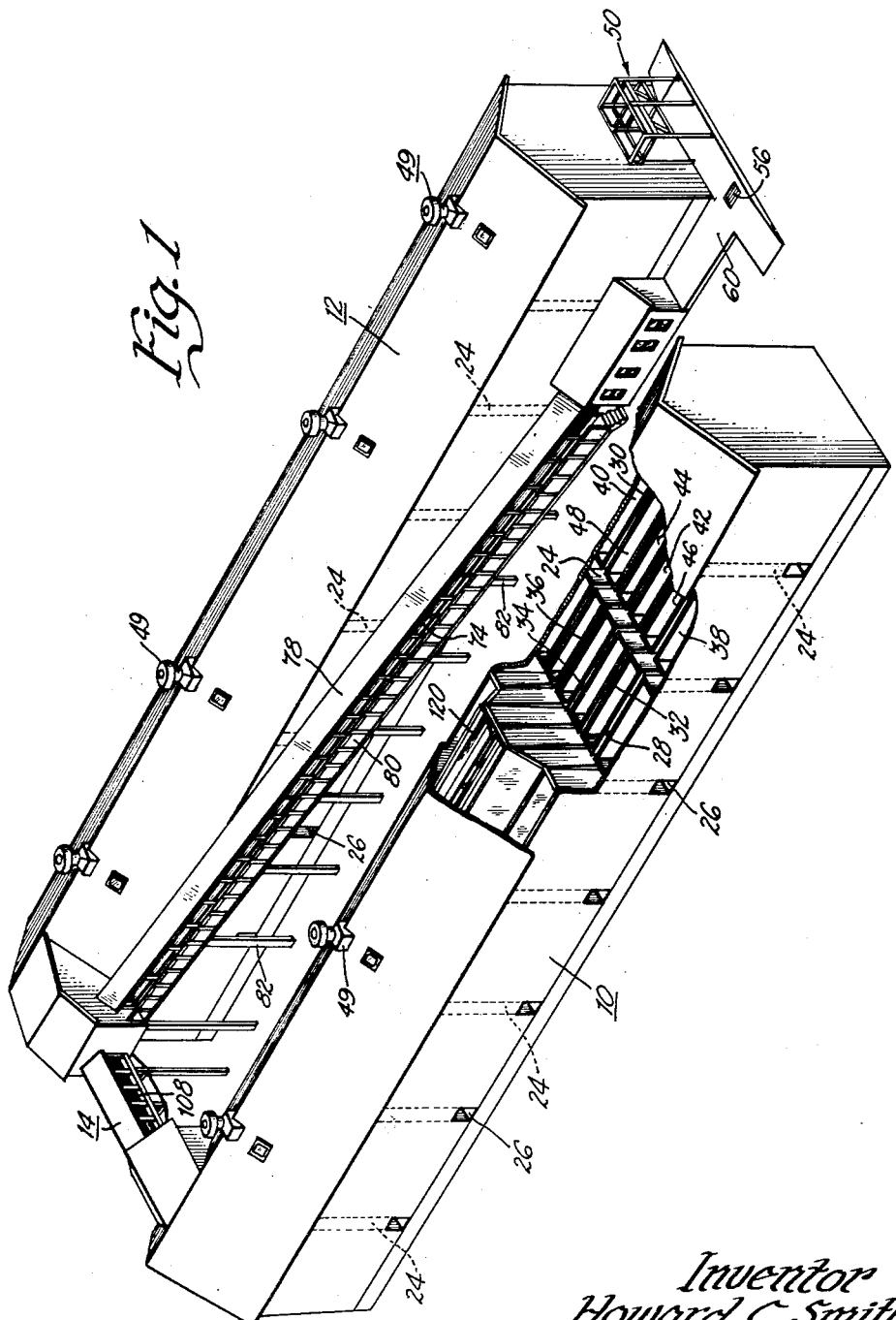
Inventor
Howard C. Smith
by Bair, Freeman & Molinare
Atty's.

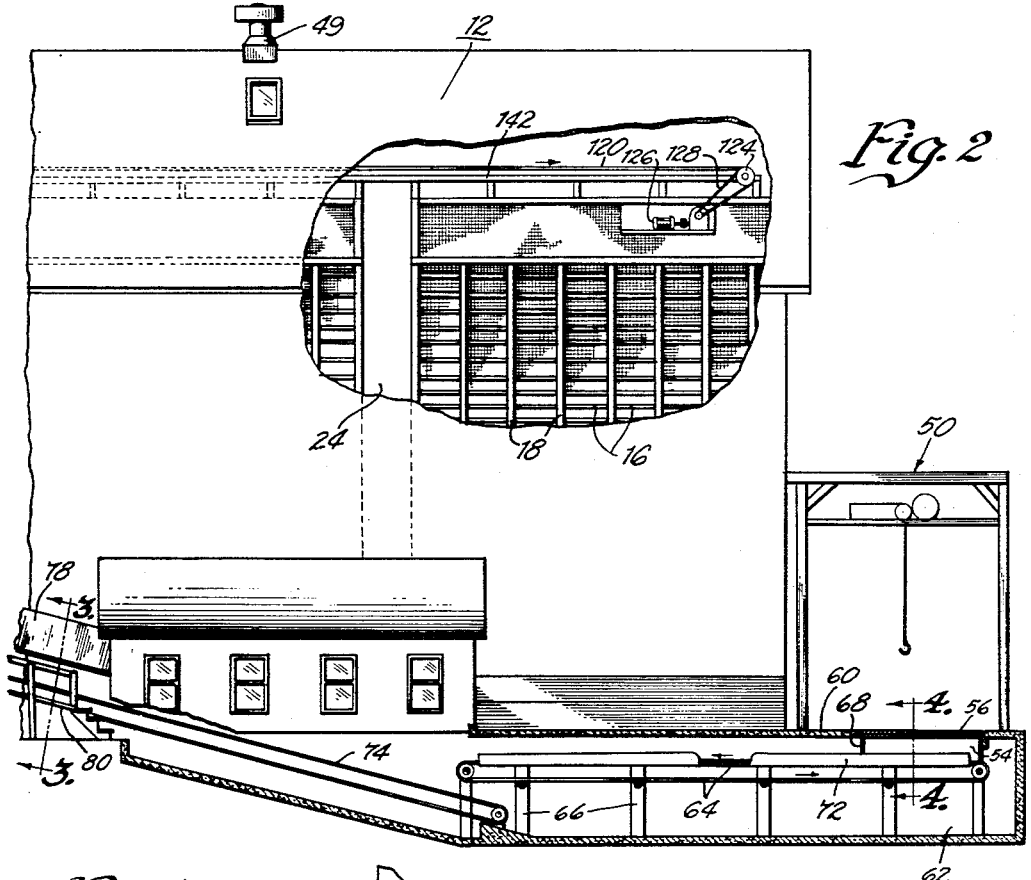
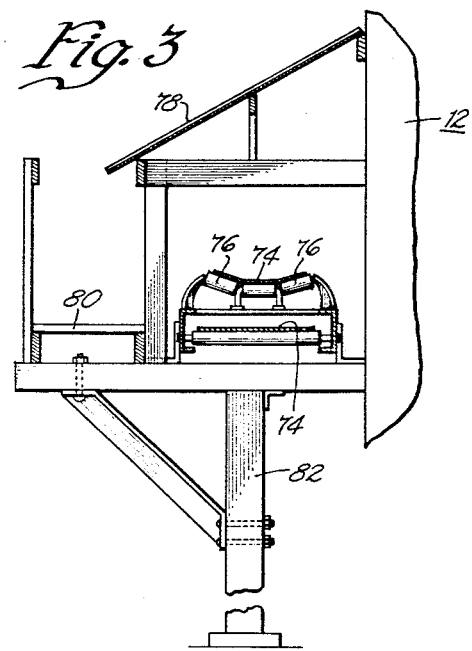
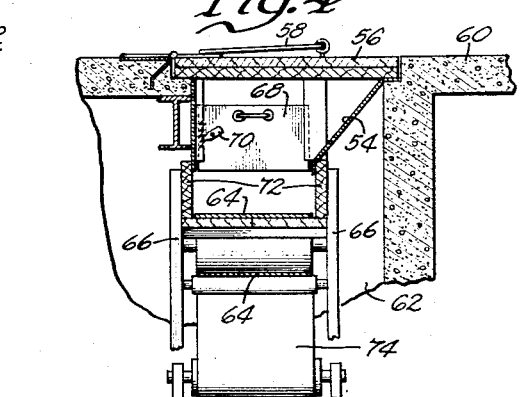

April 12, 1955 H. C. SMITH 2,705,909
APPARATUS FOR STORING CORN
Filed Oct. 14, 1950 5 Sheets-Sheet 3

Inventor
Howard C. Smith
by Bair, Freeman & Molinare
Attys.

April 12, 1955  H. C. SMITH  2,705,909
APPARATUS FOR STORING CORN
Filed Oct. 14, 1950  5 Sheets-Sheet 4
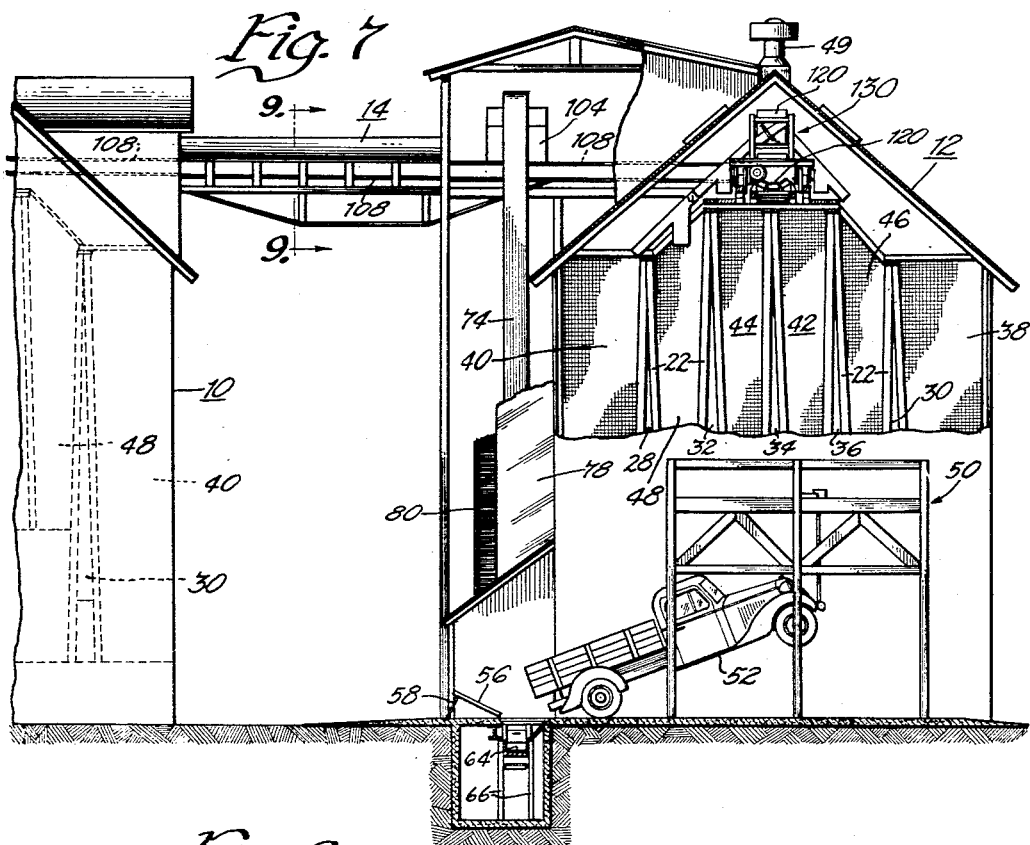
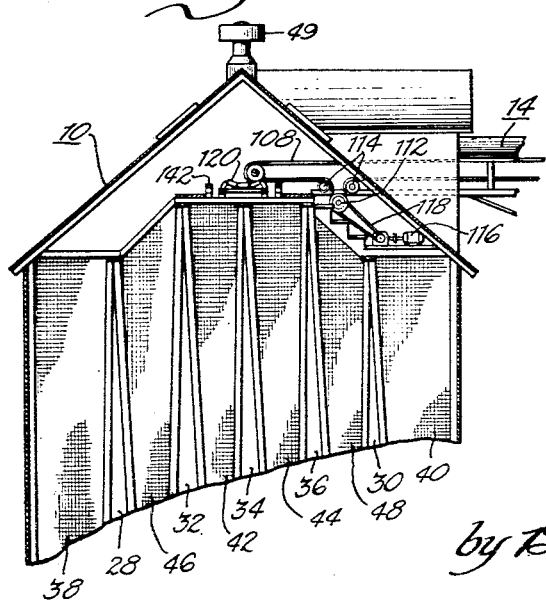
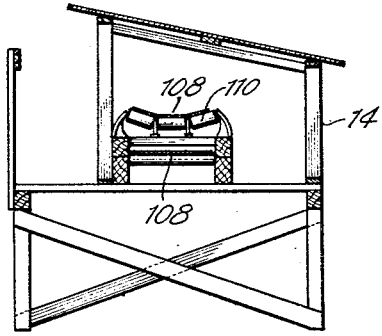
Inventor
Howard C. Smith
by Bair, Freeman & Molinare
Atty's.

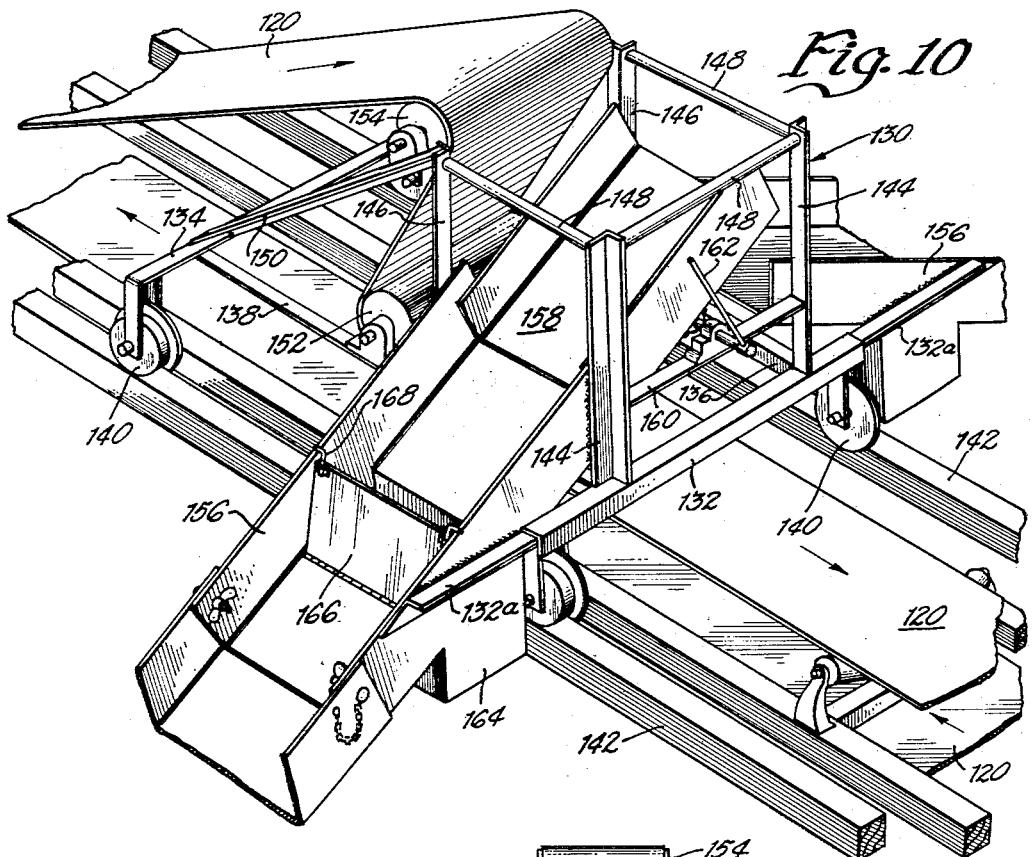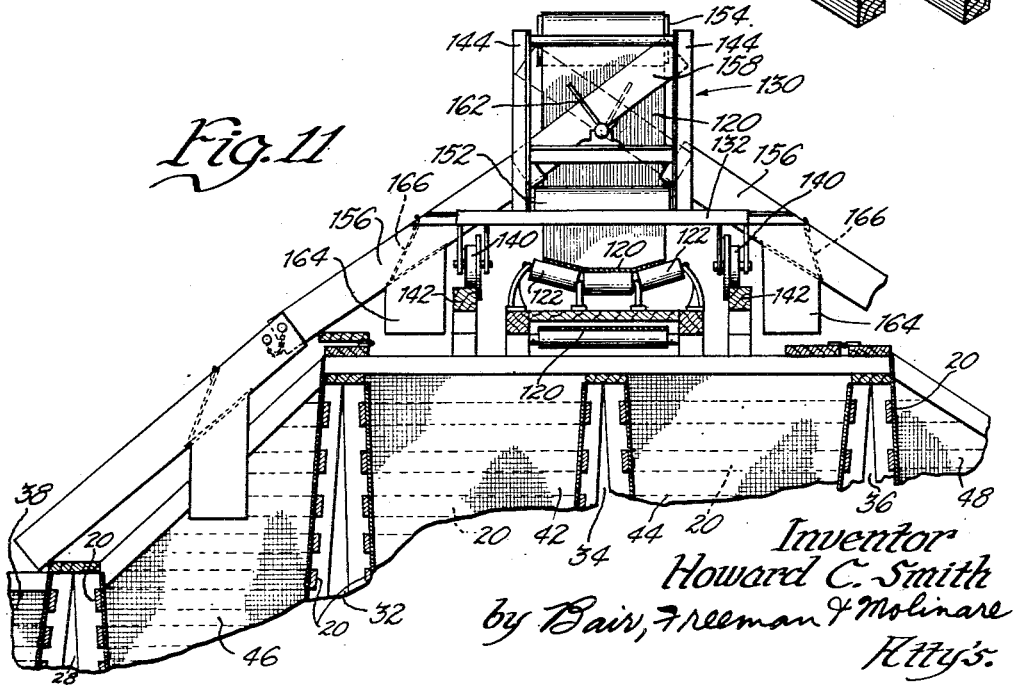

United States Patent Office 2,705,909
Patented Apr. 12, 1955

2,705,909

APPARATUS FOR STORING CORN

Howard C. Smith, Sioux City, Iowa, assignor to American Pop Corn Company, Sioux City, Iowa, a corporation of Iowa Application October 14, 1950, Serial No. 190,120

2 Claims. (Cl. 98—55)

This invention relates to apparatus for storing pop corn.

An important object of this invention is to provide a building containing receptacles for storing large volumes of pop corn ears with free exposure to the outside atmosphere and provided with conveyors for moving the pop corn into the building, separating means for removing loose kernels and husks from the pop corn and further conveyors for gently depositing the pop corn ears in said receptacles without detaching kernels therefrom.

Other and further objects and features of this invention will become apparent from the following description and appended claims as illustrated by the accompanying drawings showing, by way of an example, apparatus according to this invention. More particularly:

Figure 1 is a perspective view of a building according to this invention made up of two elongated structures connected by a bridge, parts being broken away to show the interior construction of the building;

Figure 2 is an enlarged fragmentary side view, with parts broken away and other parts in vertical section, showing one end of one of the structures of the building of Figure 1 where trucks are unloaded onto a conveyor system forming part of said building;

Figure 3 is an enlarged fragmentary cross section along line 3—3 of Figure 2, with parts broken away;

Figure 4 is an enlarged fragmentary cross sectional view along line 4—4 of Figure 2;

Figure 7 is an enlarged end view of the structure also shown in Figure 2, with parts broken away and parts shown in vertical section;

Figure 8 is an enlarged transverse vertical cross sectional view through the end portion of the other structure of the building of Figure 1 taken adjacently the bridge connecting the two structures;

Figure 9 is an enlarged cross sectional view taken along line 9—9 of Figure 7;

Figure 10 is an enlarged perspective view of a belt tripper forming part of the apparatus in the building of Figure 1; and Figure 11 is an end view of the belt tripper of Figure 10.

Figure 5:
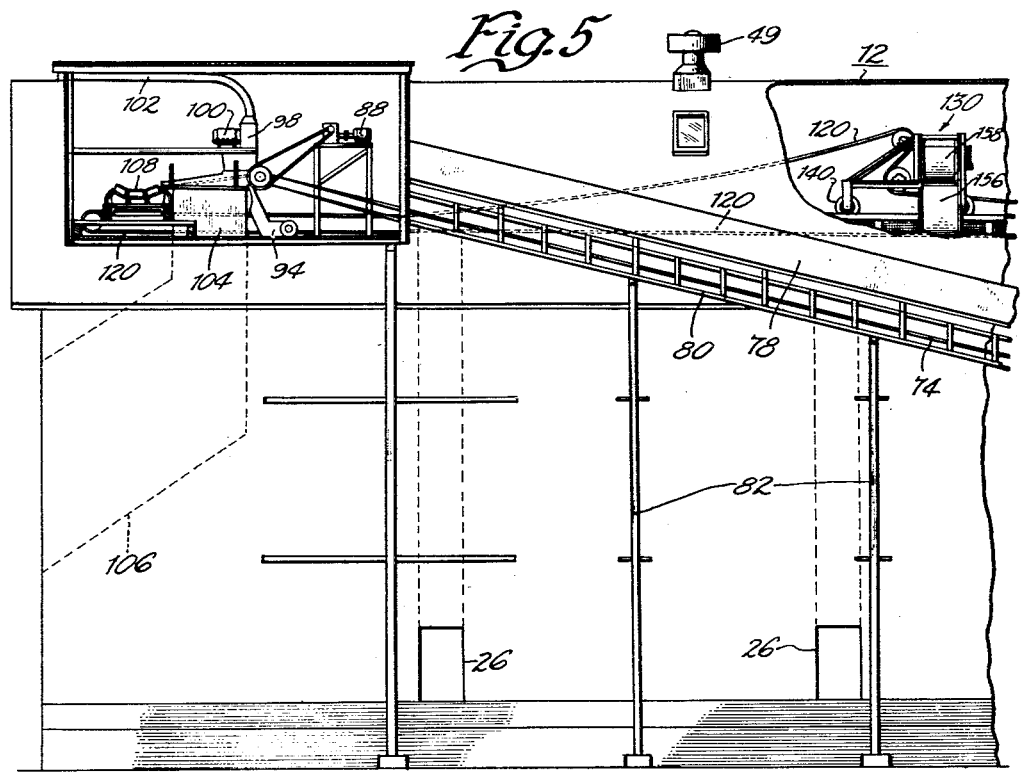
Figure 5 is an enlarged fragmentary vertical cross sectional view of the building of Figure 1 taken through the bridge of said building, with parts broken away, and showing the unloading end of a conveyor system partially shown in Figure 2.

The building shown in the drawings is made up of two parallel spaced left and right gabled structures 10 and 12 connected (see Figures 1 and 7) at one end by a covered bridge 14 spanning the gap between the two structures near the tops thereof. The exterior building walls are freely permeable to the atmosphere and, as shown in Figure 2, may comprise spaced narrow slats or boards 16 over a permeable fabric such as hardware cloth. The slats or boards 16 may be attached to spaced erect posts 18. Interiorly, the structures 10 and 12 are subdivided into cribs or compartments separated by longitudinal and transverse air channels (see Figures 1, 2, 7 and 8). The walls or partitions defining these cribs and air channels are also freely permeable to the atmosphere, being constructed similarly to the exterior building walls, as with spaced narrow slats or boards 20 supported by vertical posts 22 and with a permeable fabric extending over said slats.

By way of an example, the structures 10 and 12 may each have seven transverse air channels 24 extending vertically therethrough from the floors to the tops of the cribs and opening at 26 through the outside building walls only at the bottom portions thereof. These lower outside openings 26 are preferably closed by doors (not shown) to exclude mice and other vermin. Further, the structures 10 and 12 have five longitudinal internal air channels of triangular upwardly tapering cross sectional form. The two outermost longitudinal air channels 28 and 30 extend upwardly from about the level of the tops of the openings 26 to the level of the roof edges. The middle three longitudinal air channels 32, 34 and 36 extend upwardly from a level higher than the tops of the openings 26 to points above the edges of the roof but short of the roof vertex. As a result, there are defined, within each of the structures 10 and 12, two outer series of aligned cribs 38 and 40 reaching to the level of the outer edge of the roof, two middle series of aligned cribs 42 and 44 having flush upper rims above the cribs 38 and 40 but short of the roofs of the structures 10 and 12, and two intermediate series of cribs 46 and 48 having their inner longitudinal rims on the level of the tops of the middle cribs 42 and 44 and their outer longitudinal rims level with the outer cribs 38 and 40. All the cribs 38, 40, 42, 44, 46 and 48 are open-topped and intercommunicate at their bottoms between the transverse air channels 24.

Ventilators 49 (of conventional construction) are provided at spaced intervals along the tops of the roofs of the structures 10 and 12.

The above described crib structure serves to permit free ventilation of the pop corn stored in the cribs, so that the corn may be dried and aged on storage throughout the period extending from the harvest through the spring months, whereby the popping characteristics of the corn are improved.

The desired popping characteristics are not obtained on storage, or at least not uniformly in all the pop corn stored, unless the corn being stored is reasonably free from husks and loose kernels. For this purpose, the present apparatus comprises both conveying means for depositing pop corn gently in said cribs (to avoid detachment of corn kernels from the ears) and for separating loose kernels of corn and corn husks from the ears before the corn is deposited in the cribs. Such means are described hereinbelow.

Referring now to Figures 1, 2 and 7, a hoist generally indicated at 50 may be provided at the end of the structure 12 away from the bridge 14 for lifting the front end of a truck 52 to dump its load of pop corn through a hopper-shaped opening 54 (normally closed by a hinged door 56 provided with a stop rod 58) formed in the roof 60 (which may extend slightly above ground level) of a subterranean pit 62 extending along the side of the structure 10 facing the structure 12 for a short distance. A belt conveyor 64 extends in this pit supported by posts 66 at a level considerably above the pit floor. One end of the conveyor 64 is disposed under the opening 54 to receive on its upper run corn dumped through said opening. A gate 68 slidable vertically in appropriate grooves in the hopper-shaped opening 54 may be adjusted to any desired height and is removably held there by a catch 70, for the purpose of regulating the depth of the layer of pop corn on the conveyor belt 64. More particularly, this layer should not exceed substantially the height of two boards 72 or the like extending along the sides of the belt conveyor 64 for preventing spilling of corn over the edges of the belt.

The conveyor 64 dumps its load onto the upper run of a conveyor belt 74 terminating in the pit 62 below the belt 54 and extending along the whole side of the structure 12 in an inclined plane, for conveying and lifting the corn to the far upper end of the structure 12, as shown in Figure 1. The belt 74 is generally trough-shaped, being supported at spaced intervals by sets of three rollers 76. The central roller 76 is arranged horizontally, while each of the outer rollers 76 slopes inwardly, to support the inclined margins of the trough-shaped belt 74. A roof 78 may extend over the belt 74, and a walk 80 may be provided along the side of the belt 74, all these structures being supported by posts 82.

At the far end of the structure 12 (as viewed in Figure 1), the roof of the structure 12 is raised above the end of roof 78 and extended laterally beyond the walk 80. The space below this extended roof part is enclosed by appropriate vertical walls and houses the upper end of the belt 74 together with separating devices described hereinbelow.

Figure 6:
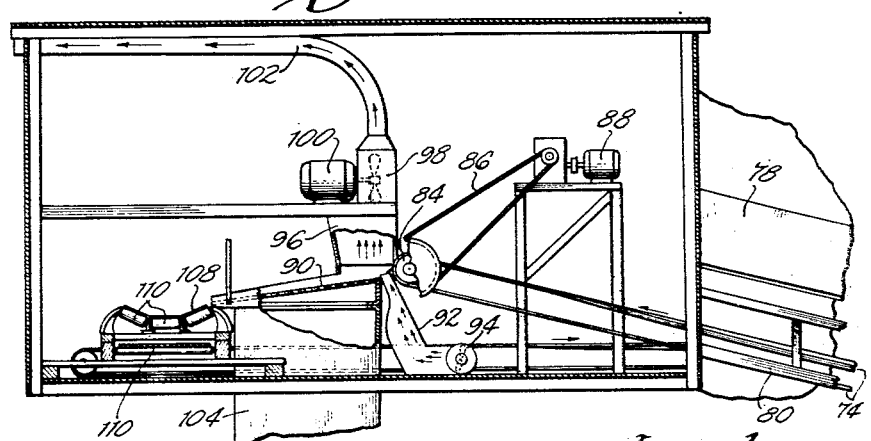
Figure 6 is a greatly enlarged fragmentary vertical cross sectional view taken along the same line as Figure 5, with parts broken away, and showing in greater detail the unloading end of said conveyor system and separating apparatus associated therewith.

As shown in Figures 5, 6 and 7 the conveyor 74 terminates at about the level of the top of the roof of the structure 12. The end of the belt 74 may be trained around a single roller 84 which is driven by a motor 86 through a belt 88.

The ears of corn carried by the conveyor 74 to the top of the structure 12 fall from the end of the conveyor 74 onto an inclined shaking screen 90 (of conventional construction). As clearly shown in Figure 6, the screen 90 is spaced from the end of the belt 74 to leave a relatively narrow gap accommodating the flattened upwardly directed discharge end of an air duct 92 provided at its intake end with a fan or blower 94. Further, a downwardly open hood 96 is arranged above the said gap and extends over the adjacent margin of the screen 90, being recessed adjacently the end of the belt 74 so as not to interfere with the dumping of corn onto the screen 90. A blower or fan 98 driven by a motor 100 applies suction to the hood 96 and blows the air sucked out of the hood through a duct 102.

As the corn falls from the end of the belt 74 onto the screen 90, the falling corn is exposed to the upwardly directed current of air from the duct 92 which carries upwardly into the hood 96 pieces of husks, light loose debris and other undesirable material from the hood 96. This light material is carried through the duct 102 for deposit at any desired location.

The screen 90 permits passage therethrough of loose kernels of corn and other relatively small but heavy particles admixed with the corn dumped by the belt 74. These kernels and other material fall through a chute 104 into a bin 106.

Thus, husks, loose kernels of corn and other undesired material of like size and weights are removed from the corn dumped by the belt 74 before the corn is deposited in the cribs by means described hereinbelow.

From the screen 90, the corn falls onto the upper run of a trough-shaped conveyor belt 108 extending from the middle of the structure 10 at a level above the tops of the middle cribs 42, 44. The belt 108 is supported by sets of three rollers 110 arranged similarly to the rollers 76. Further, the belt 108 is driven in either of two opposed directions by a roller 112 around which a bight of the lower run of the belt is trained, the necessary tension being effected by rollers 114. The roller 112 is driven from a motor 116 by a belt 118.

As disclosed hereinabove, the crib arrangement in both of the structures 10 and 12 is identical. Likewise, identical means for loading the cribs with corn from the belt 108 are provided for each of the structures 10 and 12. The following description of said means will therefore apply to both of the structures 10 and 12.

Referring now to Figures 2, 7 and 8, a trough-shaped conveyor belt 120 extends lengthwise of each of the structures 10 and 12 above the middle air channel 34 but at a level below the belt 108 so that the latter conveyor will dump corn onto the upper run of the belt 120 for carrying the corn to a point where it is deposited in one of the cribs. The belt 120 may be supported at spaced intervals by sets of three rollers 122 arranged similarly to the rollers 76. A single roller 124 may drive the belt 120, being in turn driven by force transmitted from a motor 126 through a belt 128.

The corn carried by the belt 120 is deposited in any desired crib by operation of a belt tripper generally indicated by the reference numeral 130 and illustrated in detail in Figures 10 and 11. As shown, the belt tripper 130 includes a generally rectangular horizontal frame made up of a front transverse bar 132, a rear transverse bar 134, a left longitudinal bar 136 and a right longitudinal bar 138. Below each of the four corners of this rectangular frame, a wheel 140 is rotatably supported from the frame so that the belt tripper can be moved over rails 142 extending on both sides of the belt 120 to any position lengthwise of either structure 10 or 12. Further, upright posts 144 are arranged at the corners formed by the front bar 132 and the longitudinal bars 136 and 138. Two other upright posts 146 are provided on the bars 136 and 138 between the bars 132 and 134. The tops of the bars 144 and 146 are interconnected by cross bars 148. Inclined bars 150 extend from the rear bar 134 to the tops of the bars 146.

Immediately behind the bars 146, a roller 152 is rotatably journalled across the bars 136 and 138. Another roller 154 is rotatably journalled on the tops of the bars 146 above the roller 152. The belt 120 passes over the roller 154 and then downwardly behind and under the roller 152, so that as the upper run of the belt 120 moves in the direction indicated by arrows, the corn carried by the belt is dumped in front of the roller 154. As the belt tripper 130 is moved over the rails 152, the position of the roller 154 is changed with respect to the belt, so that the latter can be caused to discharge (by dumping over the roller 154) at any desired point lengthwise of either structure 10 or 12.

Appropriate brakes (not shown) may be provided to hold the belt tripper 130 at any desired location on the rails 142.

For directing the corn dumped by the belt 120 into any desired crib 38, 40, 42, 44, 46 or 48, the belt tripper 130 is provided with two transverse inclined chutes 156 of generally U-shaped cross sectional form. These chutes are supported by extensions 132a of the front frame bar 132 and extend upwardly only barely past the posts 144, so that the upper ends of the two chutes 156 are spaced apart by about the width of the belt 120. In the resulting interspace, a second transverse chute 158 also of generally U-shaped cross sectional form is swingably supported across its middle from cross bars 160 extending between the posts 144 and between the posts 146. As shown in Figure 11, the chute 158 may be swung or tipped into either of two positions (one indicated in full lines and the other in broken lines) where one chute end overlaps the upper end of one chute 156 and the other chute end projects slightly past the other edge of the belt 120, to direct the corn dumped by the belt 120 at will into either of the chutes 156. Such swinging or tipping may be effected by operating a hand lever 162 rigidly connected to the chute 158.

Each of the chutes 156 is provided with two spaced depending hoppers 164 opening upwardly through the floor of the chute 156 and disposed to discharge corn, respectively, into a middle crib 42 or 44 or into an intermediate crib 46 or 48. Further, there is provided for each hopper 164 a transverse gate 166 hinged to the lower hopper edge. These gates serve, when lowered, to close the hoppers 164 against movement of corn therethrough and, when raised, to prevent movement of corn past one of the hoppers 164. Catches 168 serve to hold the gates 166 removably in raised position. At its end, each chute 156 is open, for discharging corn into one of the outer cribs 38 or 40 when both gates 166 are lowered to close both hoppers 168.

It will be understood that corn may be discharged from the belt 129 into any desired crib by moving the belt tripper 130 lengthwise of the belt 120 abreast of any desired crib, then swinging or tipping the chute 158 for directing corn discharged from the belt 120 to the right or to the left, as may be desired, and finally opening or closing the chute gates 166 to discharge corn from the chute 156 into an inner, an intermediate or outer crib.

As disclosed hereinabove, the present apparatus for storing corn includes conveying means for receiving corn from a truck and depositing the corn gently in cribs permeable and accessible to the circulation of atmospheric air therethrough while protecting the corn against direct atmospheric precipitation such as rain or snow. Further, the apparatus includes means for separating husks, loose corn kernels and other material of like sizes and weights from the corn ears before the corn ears are deposited in the cribs. These separating means form part of the conveying means and the removal of the indicated materials makes possible the free flow of atmospheric air through the stored corn. Note that husks, loose kernels of corn and the like, if admixed with ears of corn, fill the interspaces between the ears and thereby prevent free circulation of air through the stored corn.

The above disclosed apparatus for storing corn is particularly adapted for receiving freshly harvested pop corn. Such pop corn ordinarily contains more than the optimum moisture content for greatest volume expansion on popping. Further, such pop corn should be aged by storing throughout a winter and spring season to develop other properties also conducive to maximum volume expansion on popping. The above disclosed apparatus is particularly useful, in the storage of freshly harvested pop corn, for effecting reduction in moisture content of the pop corn to the optimum level. It should be noted, in this connection, that rapidly effected reduction in moisture content, as by drying at an elevated temperature, does not give as great volume expansion on popping as drying by exposure to atmospheric air. The above described apparatus also lends itself particularly well for carrying out the above noted aging process, in which heat is generated spontaneously in the corn being stored. The atmospheric air circulating through the corn stored in the above disclosed apparatus functions not only to promoting reduction in moisture content, but also to dissipate heat generated in said aging process.

Many details in structure and procedure may be varied without departing from the principles of this invention. It is therefore not my purpose to limit the patent granted on this invention otherwise than necessitated by the scope of the appended claims.

I claim:

1. A structure for storing pop corn comprising an elongated building having walls permeable to atmospheric air, longitudinal and transverse partitions in said building permeable to atmospheric air and subdividing said building into a plurality of spaced open-topped corn cribs extending vertically short of the roof of said building and including a plurality of sets of cribs aligned lengthwise of said building and having vertical spaces between said sets of cribs forming transverse air channels, means at the sides of said building and adjacent the floor thereof for communicating said vertical spaces with the atmosphere, opposed pairs of the partitions forming said longitudinal air channels being oppositely inclined slightly to the vertical whereby said longitudinal air channels are constricted at their upper ends and said cribs are constricted laterally at their lower ends.

2. A structure for storing popcorn comprising an elongated building provided with a roof, perforate partitions in said building for sub-dividing it into a plurality of longitudinally and laterally spaced, open-topped corn cribs, the partitions at the ends of said cribs defining lateral air spaces extending between the side walls and from bottom to top of said building, the lower portions of said side walls having air entrance openings communicating with said lateral air spaces, the partitions at the sides of said cribs defining longitudinal air spaces communicating at their ends with said lateral air spaces and being inclined slightly from the vertical to provide said longitudinal air spaces wider at their bottoms and said cribs wider at their tops, said cribs terminating short of said roof of said building, and said roof being provided with air exit openings to receive air from the open tops of said cribs.

References Cited in the file of this patent

UNITED STATES PATENTS

| | | |
|---|---|---|
| 132,784 | Willson | Nov. 5, 1872 |
| 688,597 | Cookman et al. | Dec. 10, 1901 |
| 710,137 | Boyer | Sept. 30, 1902 |
| 847,309 | Baldwin et al. | Mar. 19, 1907 |
| 920,602 | Meyer | May 4, 1909 |
| 1,019,470 | Helgerson | Mar. 5, 1912 |
| 1,048,091 | Nelson | Dec. 24, 1912 |
| 1,307,046 | Getz et al. | June 17, 1919 |
| 1,579,239 | Owen | Apr. 6, 1926 |
| 1,621,575 | Bakker | Mar. 22, 1927 |
| 1,762,019 | Jandl | June 3, 1930 |
| 2,007,683 | Kreutzer | July 9, 1935 |
| 2,217,945 | Digre | Oct. 15, 1940 |
| 2,298,198 | Coultas | Oct. 6, 1942 |

FOREIGN PATENTS

| | | |
|---|---|---|
| 18,756 | Great Britain | A. D. 1903 |
| 42,260 | Switzerland | Dec. 13, 1907 |
| 47,373 | France | Dec. 29, 1936 |
| | (Addition to No. 802,975) | |